United States Patent
Liu et al.

(10) Patent No.: US 10,332,309 B2
(45) Date of Patent: Jun. 25, 2019

(54) METHOD AND APPARATUS FOR IDENTIFYING BUILDINGS IN TEXTURED 3D MESH DATA AND GENERATING 3D BUILDING MODELS

(71) Applicant: HERE Global B.V., Veldhoven (NL)

(72) Inventors: Xiaoqing Liu, Pleasanton, CA (US);
Jeffrey Adachi, El Cerrito, CA (US);
Antonio Haro, Hercules, CA (US);
Jane MacFarlane, Oakland, CA (US)

(73) Assignee: HERE Global B.V., Veldhoven (NL)

( * ) Notice: Subject to any disclaimer, the term of this patent is extended or adjusted under 35 U.S.C. 154(b) by 167 days.

(21) Appl. No.: 14/862,791

(22) Filed: Sep. 23, 2015

(65) Prior Publication Data
US 2017/0084077 A1 Mar. 23, 2017

(51) Int. Cl.
*G06T 17/05* (2011.01)
*G06T 17/20* (2006.01)
(Continued)

(52) U.S. Cl.
CPC .......... *G06T 17/05* (2013.01); *G06K 9/00201* (2013.01); *G06K 9/00664* (2013.01);
(Continued)

(58) Field of Classification Search
CPC ....... G06T 17/05; G06T 17/20; G06T 7/0075; G06T 7/60; G06T 15/04; G06K 9/52; G06K 9/6215; G06K 9/6218
(Continued)

(56) References Cited

U.S. PATENT DOCUMENTS 8,963,943 B2 2/2015 Chu et al.
2004/0105573 A1* 6/2004 Neumann ............... G06T 17/00
382/103

(Continued)

OTHER PUBLICATIONS

Verma, Vivek, Rakesh Kumar, and Stephen Hsu. "3d building detection and modeling from aerial lidar data." Computer Vision and Pattern Recognition, 2006 IEEE Computer Society Conference on. vol. 2. IEEE, 2006.*

(Continued)

*Primary Examiner* — King Y Poon
*Assistant Examiner* — Vincent Peren
(74) *Attorney, Agent, or Firm* — Ditthavong & Steiner, P.C.

(57) ABSTRACT

An approach is provided for identifying objects present in mesh representation of a geo-location, generating accurate 3D models for the objects, and aligning the 3D models to their corresponding objects in an application. The approach comprises processing and/or facilitating a processing of textured three-dimensional mesh data in one or more regions of interest to cause, at least in part, a generation of at least one two-dimensional depth image representation. The approach further comprises causing, at least in part, a filtering of the textured three-dimensional mesh data in the one or more regions of interest to remove mesh data below at least one threshold height based, at least in part, on the at least one two-dimensional depth image representation. Additionally, the approach comprises processing and/or facilitating a processing of the filtered textured three-dimensional mesh data to cause, at least in part, a generation of at least one partial three-dimensional model, including one or more upper facades above the at least one threshold height, of one or more objects located within the one or more regions of interest.

16 Claims, 16 Drawing Sheets

(51) Int. Cl.
*G06T 15/04* (2011.01)
*G06K 9/00* (2006.01)
*G06K 9/62* (2006.01)

(52) U.S. Cl.
CPC ............ *G06K 9/6255* (2013.01); *G06T 15/04* (2013.01); *G06T 17/20* (2013.01); *G06T 2210/04* (2013.01)

(58) Field of Classification Search
USPC ........................................................ 345/423
See application file for complete search history.

(56) References Cited

U.S. PATENT DOCUMENTS

| | | | |
|---|---|---|---|
| 2009/0310867 A1* | 12/2009 | Matei | G06T 7/11 382/195 |
| 2015/0109295 A1 | 4/2015 | Xu et al. | |
| 2015/0221079 A1* | 8/2015 | Schultz | G06T 7/0004 382/190 |

OTHER PUBLICATIONS

Verma et al., "3D Building Detection and Modeling from Aerial LIDAR Data," Proceedings of the 2006 IEEE Computer Society Conference on Computer Vision and Pattern Recognition (CVPR'06), IEEE, 2006.*

You et al., "Urban Site Modeling From LiDAR", 2003, published in Proceedings of the 2003 international conference on Computational science and its applications: PartIII, 10 pages.

Zhu et al., "Feature Line Based Building Detection and Reconstruction from Oblique Airborne Imagery", The International Archives of the Photogrammetry, Remote Sensing and Spatial Information Sciences, vol. XL-4/W5, 2015 Indoor-Outdoor Seamless Modelling, Mapping and Navigation, May 21-22, 2015, Tokyo, Japan, pp. 199-204

Zhou et al., "2.5D Dual Contouring: a Robust Approach to Creating Building Models From Aerial Lidar Point Clouds", published in 11th European Conference on Computer Vision, Proceedings, Part III, vol. 6313 of the series Lecture Notes in Computer Science, Sep. 5-11, 2010, 14 pages.

* cited by examiner

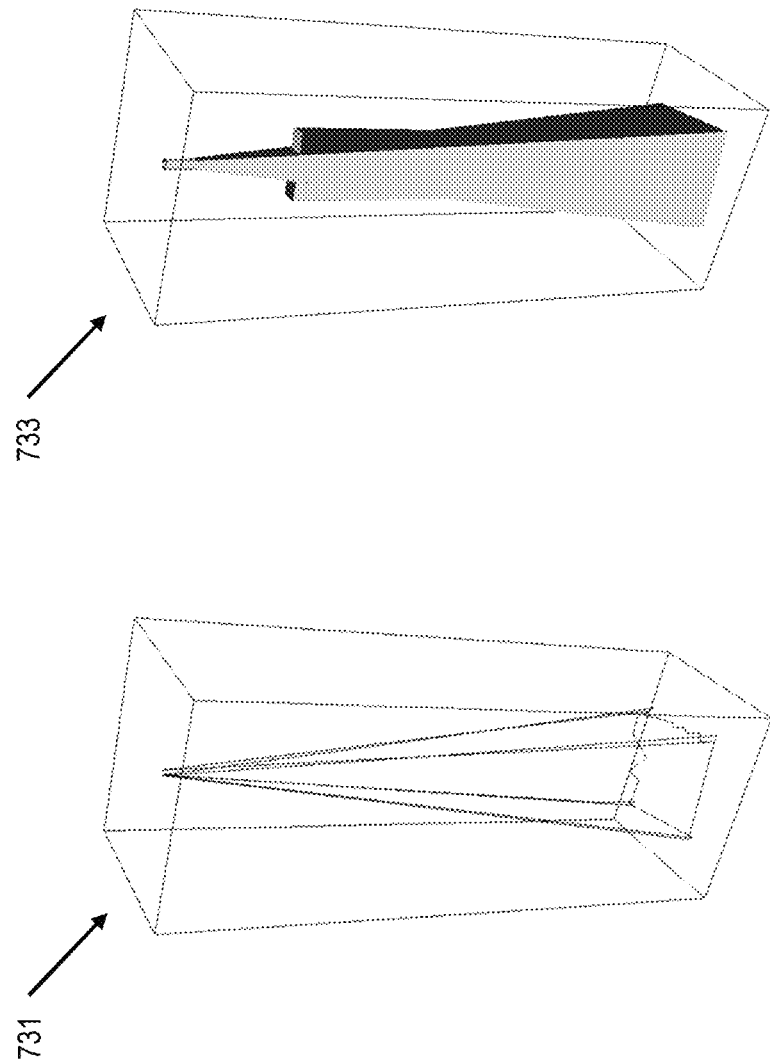

METHOD AND APPARATUS FOR IDENTIFYING BUILDINGS IN TEXTURED 3D MESH DATA AND GENERATING 3D BUILDING MODELS

BACKGROUND

Service providers and device manufacturers (e.g., wireless, cellular, etc.) are continually challenged to deliver value and convenience to consumers by, for example, providing location-based services via various applications at user devices such as mobile devices, navigation systems, personal digital assistants, laptops, etc. In an application such as digital map of a geo-location, three-dimensional (3D) models of buildings or objects may be useful or important features in providing location-based information or services. Content, service, or application providers may utilize a variety of data sources and methods for generating 3D building models for a geo-location. However, those methods may be inefficient (e.g., use of semi-manual processes, not scalable); prone to errors (e.g., misalignments of 3D building models to a digital map) due to use of different data sources (e.g., street level and satellite imagery); and inaccurate for assuming certain properties of the actual buildings and the surrounding area (e.g., vertical walls, flat roofs, flat ground surface, etc.) As a result, service providers face significant technical challenges in accurate detection of 3D objects that may be present at a geo-location and providing accurate 3D models for the objects.

SOME EXAMPLE EMBODIMENTS

Therefore, there is a need for an approach for identifying objects present in an image of a geo-location, generating accurate 3D models for the objects, and aligning the 3D models to their corresponding objects in an application.

According to one embodiment, a method comprises processing and/or facilitating a processing of textured three-dimensional mesh data in one or more regions of interest to cause, at least in part, a generation of at least one two-dimensional depth image representation. The method also comprises causing, at least in part, a filtering of the textured three-dimensional mesh data in the one or more regions of interest to remove mesh data below at least one threshold height based, at least in part, on the at least one two-dimensional depth image representation. Additionally, the method comprises processing and/or facilitating a processing of the filtered textured three-dimensional mesh data to cause, at least in part, a generation of at least one partial three-dimensional model, including one or more upper facades above the at least one threshold height, of one or more objects located within the one or more regions of interest.

According to another embodiment, an apparatus comprises at least one processor, and at least one memory including computer program code for one or more computer programs, the at least one memory and the computer program code configured to, with the at least one processor, cause, at least in part, the apparatus to process and/or facilitate a processing of textured three-dimensional mesh data in one or more regions of interest to cause, at least in part, a generation of at least one two-dimensional depth image representation. The apparatus is also caused to cause, at least in part, a filtering of the textured three-dimensional mesh data in the one or more regions of interest to remove mesh data below at least one threshold height based, at least in part, on the at least one two-dimensional depth image representation. Additionally, the apparatus is caused to process and/or facilitate a processing of the filtered textured three-dimensional mesh data to cause, at least in part, a generation of at least one partial three-dimensional model, including one or more upper facades above the at least one threshold height, of one or more objects located within the one or more regions of interest.

According to another embodiment, a computer-readable storage medium carries one or more sequences of one or more instructions which, when executed by one or more processors, cause, at least in part, an apparatus to process and/or facilitate a processing of textured three-dimensional mesh data in one or more regions of interest to cause, at least in part, a generation of at least one two-dimensional depth image representation. The apparatus is also caused to cause, at least in part, a filtering of the textured three-dimensional mesh data in the one or more regions of interest to remove mesh data below at least one threshold height based, at least in part, on the at least one two-dimensional depth image representation. Additionally, the apparatus is caused to process and/or facilitate a processing of the filtered textured three-dimensional mesh data to cause, at least in part, a generation of at least one partial three-dimensional model, including one or more upper facades above the at least one threshold height, of one or more objects located within the one or more regions of interest.

According to another embodiment, an apparatus comprises means for processing and/or facilitating a processing of textured three-dimensional mesh data in one or more regions of interest to cause, at least in part, a generation of at least one two-dimensional depth image representation. The apparatus also comprises means for causing, at least in part, a filtering of the textured three-dimensional mesh data in the one or more regions of interest to remove mesh data below at least one threshold height based, at least in part, on the at least one two-dimensional depth image representation. Additionally, the apparatus comprises means for processing and/or facilitating a processing of the filtered textured three-dimensional mesh data to cause, at least in part, a generation of at least one partial three-dimensional model, including one or more upper facades above the at least one threshold height, of one or more objects located within the one or more regions of interest.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-49.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 7A through 7G include illustrations associated with a building in a region of interest and a 3D model of the building, according to various embodiments;

DESCRIPTION OF SOME EMBODIMENTS

Examples of a method, apparatus, and computer program for identifying objects present in an image of a geo-location, generating accurate 3D models for the objects, and aligning the 3D models to their corresponding objects in an application, are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention. Although various embodiments are described with respect to identifying buildings present in an image of a geo-location, generating accurate 3D models for the buildings, and aligning the 3D models to their corresponding buildings in a map application, it is contemplated that the approach described herein may be applicable to any invention that can be modelled according to the example processes described below and can benefit from identifying objects present in an image of a geo-location, generating accurate 3D models for the objects, and aligning the 3D models to their corresponding objects in various applications.

Figure 1:
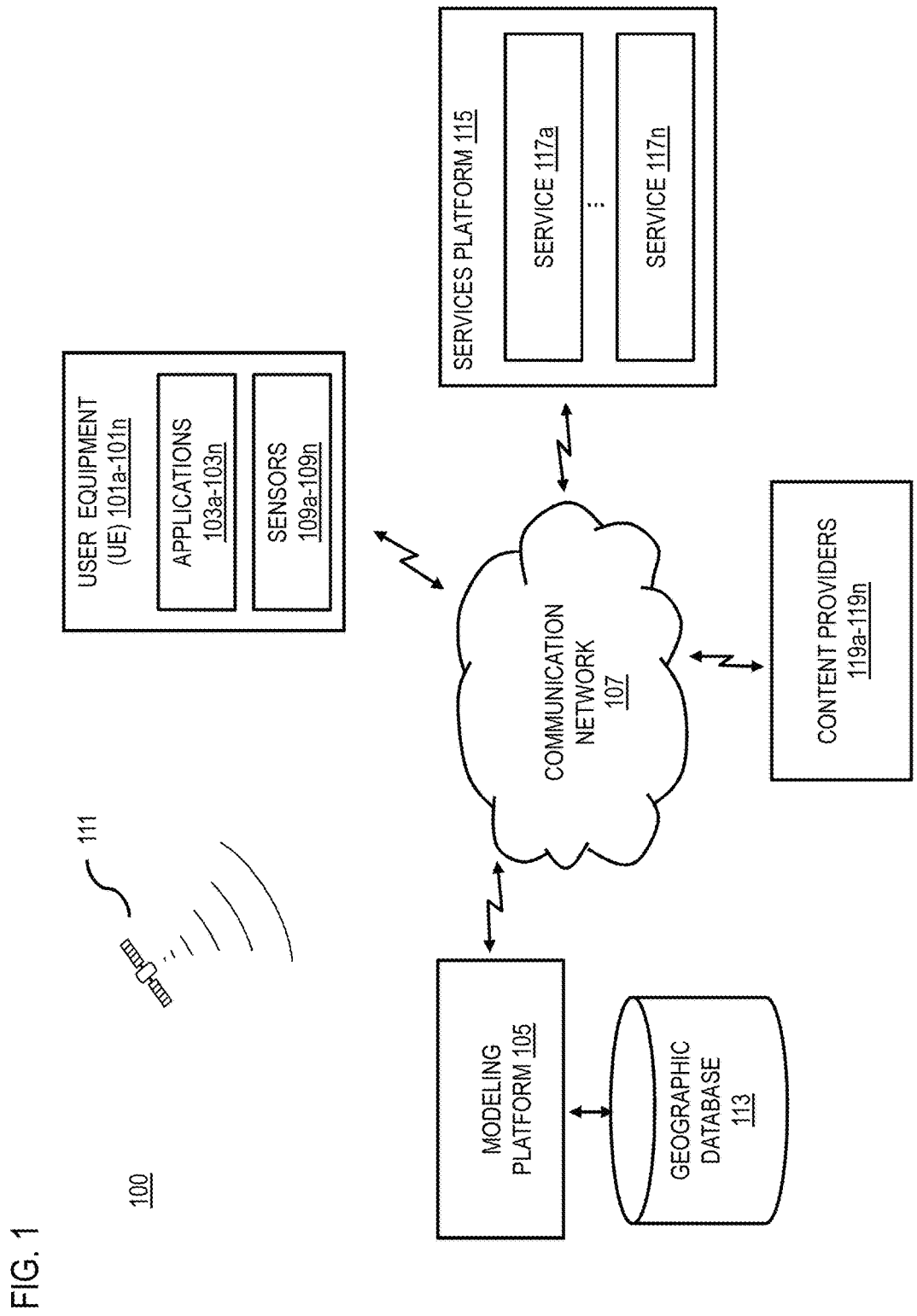
FIG. 1 is a diagram of a system capable of identifying objects present in an image of a geo-location, generating accurate 3D models for the objects, and aligning the 3D models to their corresponding objects in an application, according to one embodiment.

FIG. 1 is a diagram of a system capable of identifying buildings present in an image of a geo-location, generating accurate 3D models for the buildings, and aligning the 3D models to their corresponding buildings in a map application, according to one embodiment. One area of interest among service providers and device manufacturers has been accurate and efficient collection and processing of data associated with objects that may be present at a given geo-location or a region-of-interest (ROI) and identifying/classifying the objects. 3D models may mean a surface model, usually a triangular mesh, which may use a single surface to describe a larger area such as a whole city. This 3D surface model is analogous to a photograph, wherein humans can infer structures of different objects; however, computers cannot distinguish between objects such as buildings, roads, ground, trees, etc. Interactions with such a 3D model may be limited to the city level, for example, zoom in/out, pan, rotate, etc. Alternatively, 3D models may mean a group of models, with each model corresponding to an individual object such as a building, road, tree, etc. This 3D model is analogous to a map, wherein interactions may be at an object-level, for example, highlight a building when given a geo-location address or vice versa. As noted earlier, different images/data sets may be utilized in creating 3D building models. In an example method, a building footprint may be traced in a satellite photo then the height of the building may be estimated using street level imagery. However, since two independent data/image sources are used, the method is susceptible to errors due misalignment between the two images in the two different sources. Additionally, as some of the method steps may be manual, the method is inefficient (e.g., labor intensive) and may not scale well. Moreover, some of the current methods assume certain features about the buildings; for example, roofs are relatively flat, roofs are separated from the ground by vertical walls, walls are vertical, ground surface is level, etc., which may not be valid for all buildings and geo-locations. Therefore, the current methods are inefficient and may yield inaccurate models.

To solve these problems, a system 100 may derive a 2D depth image from a textured 3D mesh data, where the 3D mesh data may be a result of a photogrammetry process for generating a set of triangles that represent a 3D surface model of a ROI including buildings and other objects (e.g., trees, cars, people, etc.) Clutter (e.g., non-building triangles), usually near ground level, may be reduced by using the 2D depth image and an adaptive image thresholding technique (e.g., Otsu's thresholding method) to remove from the ROI all triangles near ground level or below. Next, for 3D models of the buildings in the ROI, the remaining 3D mesh may be partitioned into a number of clusters by utilizing a non-parametric (e.g., meanshift-based) clustering technique or contour-based partitioning followed by a non-parametric clustering procedure, wherein elements in each cluster may have similar properties including face normal, geolocation, texture, etc. In one scenario, a parametric clustering technique (e.g., k-means clustering) with domain specific knowledge or other strategies to choose an optimal number of clusters may be employed. Further, a random sample consensus (RANSAC) based model-fitting process (e.g., plane/surface fitting) may be applied to each cluster of the triangular meshes independently to extract corresponding building facades/surfaces. Furthermore, a pair-wise surface-to-surface (e.g., plane-to-plane) intersection computation may be used to refine (e.g. close gaps, remove small extruding facades, etc.) the 3D model of the ROI including one or more buildings.

In one embodiment, the system 100 may determine one or more ROIs within a set of textured 3D mesh data, the textured 3D mesh data representing at least one geographic area. In one instance, the ROIs and/or the geographic area may be determined by a service provider, a user of a service, an application at a user device, etc. In one embodiment, the at least one textured 3D representation may be a polygon-based 3D representation, providing height information, on which the 3D texture information is mapped. The 3D mesh data may already be available to the system 100 from one or more sources, or the system 100 may generate the 3D mesh data. In one embodiment, the system 100 may determine the textured 3D mesh data based, at least in part, on at least one aerial photogrammetry surface mesh.

In one embodiment, the system 100 may process and/or facilitate a processing of textured 3D mesh data in one or more regions of interest to cause, at least in part, a generation of at least one 2D depth image representation. In one embodiment, the textured three-dimensional mesh data, the one or more regions of interest, or a combination thereof is received from another source and is associated with at least one geographic area. In one scenario, once a ROI is determined, the 3D mesh input data may be processed to extract 3D triangles included inside of the ROI. Then, a piece-wise 3D to 2D projection may be utilized to obtain a corresponding 2D depth image. Intensity value for each pixel of the 2D depth image may be computed based on a linear interpolation of corresponding 3D triangle in the mesh data.

In one embodiment, the system 100 may cause, at least in part, a filtering of the textured 3D mesh data in the one or more ROIs to remove mesh data below at least one threshold height based, at least in part, on the at least one 2D depth image representation. In one example, mesh data below a certain level of a building may be filtered out and the remaining mesh data associated with levels above the threshold may be retained for further processing. In some scenarios, even without other objects (e.g., trees, cars, people, etc.) near a building, aerial photogrammetry surface mesh errors tend to be toward the bottom of buildings; hence, filtering out these errors may allow creating models of the wall surfaces using the filtered data for upper levels of the building. In one embodiment, the threshold height may be determined by one or more algorithms utilized by the system 100, for example, from previous data associated with the ROI and/or another nearby building.

In one embodiment, the system 100 may process and/or facilitate a processing of the filtered textured 3D mesh data to cause, at least in part, a generation of at least one partial 3D model, including one or more upper facades above the at least one threshold height, of one or more objects located within the one or more regions of interest. In one example, the system 100 may process the remaining 3D mesh data to determine base, elevation, wall surfaces, or the like information associated with a building by utilizing color and texture information embedded in the textured 3D mesh data. In one scenario, a partial 3D model of a building may include surfaces/facades from the top of the building to a threshold height above the ground surface surrounding the building.

In one embodiment, the system 100 may process and/or facilitate a processing of the textured 3D mesh data to determine at least one ground surface representation in the one or more regions of interest, wherein removing the mesh data below the at least one threshold height includes removing the textured 3D mesh data associated with the at least one ground surface representation. In one scenario, the filtering process may remove ground level as well as lower level (e.g., surrounding a building) mesh data within the ROI. In one embodiment, the filtering process may yield 3D mesh data for a building without any irregular surrounding mesh data (e.g., for cars, trees, other objects, irregular shapes of the building walls/features, etc.) for lower levels of the building.

In one embodiment, the system 100 may cause, at least in part, one or more extrapolations of the one or more upper facades to the at least one ground surface for determining one or more lower facades below the at least one threshold height. For example, one or more algorithms may be used to extrapolate the upper surfaces (e.g., above the first floor) of a building down to the ground surface surrounding the building.

In one embodiment, the system 100 may cause, at least in part, a generation of at least one complete three-dimensional model of the one or more objects based, at least in part, on the one or more upper and the one or more lower facades forming one or more continuous facades to the at least one ground surface. For example, once the lower surfaces are determined by extrapolating the upper surfaces down to the ground level, a complete 3D model of the building may be generated.

In one embodiment, the system 100 may perform the filtering of the textured 3D mesh data using at least one adaptive-thresholding technique based, at least in part, on a determined ground surface in the one or more regions of interest. In one embodiment, an adaptive-thresholding technique, for example, Otsu's thresholding method may be applied to the 2D depth image to filter out ground and lower surrounding meshes associated with a building in the ROI. The use of an adaptive filtering algorithm may allow the algorithm to follow a sloping ground (e.g., a hilly area), rather than using a single elevation threshold for the entire ROI.

In one embodiment, the system 100 may cause, at least in part, a partitioning of the filtered textured 3D mesh data into one or more clusters using, at least one parametric, non-parametric, or a combination thereof clustering technique, wherein the generation of the at least one partial three-dimensional model is based, at least in part, on the one or more clusters. In some scenarios, the remaining textured 3D mesh data may be processed and partitioned into a number of clusters utilizing a parametric, non-parametric, or a combination thereof clustering technique. In one embodiment, a contour based partitioning method may be utilized and followed by a parametric, non-parametric, or a combination thereof clustering procedure. In one embodiment, the one or more clusters are based, at least in part, on a similarity with respect to one or more properties, and wherein the one or more properties include, at least in part, a geometry property, a geometrical orientation property, a geo-location property, a texture property, an edge orientation property, or a combination thereof.

In one embodiment, the system 100 may process and/or facilitate a processing of the one or more clusters using at least one model-fitting technique to determine the one or more upper facades for the at least one partial 3D model. In one embodiment, a RANSAC based model fitting procedure (e.g., for surface fitting) may be applied on each cluster of 3D mesh data independently to extract corresponding building facades. In some scenarios, a RANSAC method for estimating surfaces may be less sensitive, when compared to other methods like least squares optimization, to data that may be an outlier of a data set.

In one embodiment, the system 100 may process and/or facilitate a processing of the at least one partial 3D model using at least one pair-wise surface-to-surface computation to refine the at least one complete 3D model. In one embodiment, a pair-wise surface-to-surface (e.g., plane-to-plane) intersection computation may be used to refine/touchup (e.g., close the gaps, remove small extruding facades, etc.) a 3D model of an object.

The system 100 may include user equipment 101a-101n (UE 101). By way of example, the UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.). The applications 103 may assist in conveying sensor information via the communication network 107.

The system 100 may also include applications 103a-103n (applications 103). By way of example, the applications 103 may be any type of application that is executable at the UE 101, such as location-based service applications, navigation applications, mapping application, sensor monitoring applications, calendar applications, content provisioning services, camera/imaging application, media player applications, social networking applications, and the like. In one embodiment, one or more of the applications 103 at the UE 101 may act as a client for the modeling platform 105 and may perform one or more functions associated with the functions of the modeling platform 105 by interacting with the modeling platform 105 over the communication network 107.

The system 100 may also include sensors 109a-109n (sensors 109). By way of example, the sensors 109 may be any type of sensor, which may interface with or be included in the UE 101. In certain embodiments, the sensors 109 may include, for example, a global positioning sensor for gathering location data (e.g., GPS), a network detection sensor for detecting wireless signals or receivers for different short-range communications (e.g., Bluetooth, Wi-Fi, Li-Fi, near field communication, etc.), temporal information sensor, a camera/imaging sensor for gathering image data, an audio recorder for gathering audio data, and the like. In one scenario, the sensors 109 may include, light sensors, orientation sensors augmented with height sensing and acceleration sensing, tilt sensors to detect the degree of incline or decline of a vehicle along a path of travel, moisture sensors, pressure sensors, etc. In one embodiment, the UE 101 may include GPS receivers to obtain geographic coordinates from satellites 111 for determining current location and time associated with at least one UE 101. In another embodiment, the sensors 109 may be a LIDAR device or sensor, a laser device, and/or other device that collects data points, such as three dimensional data, by transmitting and receiving light. For example, the LIDAR sensors use one or more lasers to collect data points representing on-ground objects in a surrounding area. The LIDAR sensors may collect and gather data points in a point cloud, such as a three dimensional point cloud, in which each data point corresponds to a local coordinate, such as (x, y, z). In one scenario, LIDAR sensors not only collect street level (i.e., outdoor) 3D point clouds, but also indoor three dimensional point clouds.

By way of example, the communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In one embodiment, the modeling platform 105 may include multiple interconnected components. The modeling platform 105 may include multiple servers, intelligent networking devices, computing devices, algorithms, components and corresponding software for creating 3D models of objects (e.g., buildings) that may be present in an image of a geo-location. Additionally, the 3D models are matched/aligned to the image of the object for use/presentation in an application (e.g., a map application). Example components of the modeling platform 105 will be illustrated in FIG. 3 and further discussed.

In one embodiment, the modeling platform 105 may include or have access to geographic database 113 to access or store any kind of data, such as one or more contextually relevant geo-location points, location proximity information, temporal information, contextual information, historical user information, etc. Data stored in the geographic database 113 may, for instance, be provided by the UE 101, the sensors 109, the services platform 115, one or more services 117a-117n (services 117), or one or more content providers 119a-119n (content providers 119). The geographic database 113 may also include data about places, such as cities, towns, or other communities, and other geographic features, such as bodies of water, mountain ranges, buildings, etc. The geographic database 113 may be maintained by the content providers 119 in association with the services platform 115 (e.g., a map developer). The map developer may collect geographic data to generate and enhance the geographic database 113. The data may be obtained from various sources, such as municipalities or respective geographic authorities. In addition, remote sensing, such as aerial or satellite photography, may be used.

The services platform 115 may include any type of service. By way of example, the services platform 115 may include mapping services, navigation services, social networking services, content (e.g., audio, video, images, etc.) provisioning services, application services, storage services, contextual information determination services, location based services, information (e.g., weather, news, etc.) based services, etc. In one embodiment, the services platform 115 may interact with the UE 101, the modeling platform 105 and the content providers 119 to supplement or aid in the processing of the content information (e.g., location information).

In one embodiment, the services 117 may be an online service that reflects interests and/or activities of users. In one scenario, the services 117 provide representations of each user (e.g., a profile), his/her social links, and a variety of additional information. The services 117 allow users to share location information, navigation related information, activities information, contextual information, historical user information and interests within their individual networks, and provides for data portability.

The content providers 119 may provide content to the UE 101, the modeling platform 105, and the services 117 of the services platform 115. The content provided may be any type of content, such as textual content, image content, video content etc. In one embodiment, the content providers 119 may provide content that may supplement content of the applications 103, sensors 109, or a combination thereof. In another embodiment, the content providers 119 may also store content associated with the UE 101, the modeling platform 105, and the services 117 of the services platform 115. In a further embodiment, the content providers 119 may manage access to a central repository of data, and offer a consistent, standard interface to data.

By way of example, the UE 101, the modeling platform 105, the services platform 115, and the content providers 119 may communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
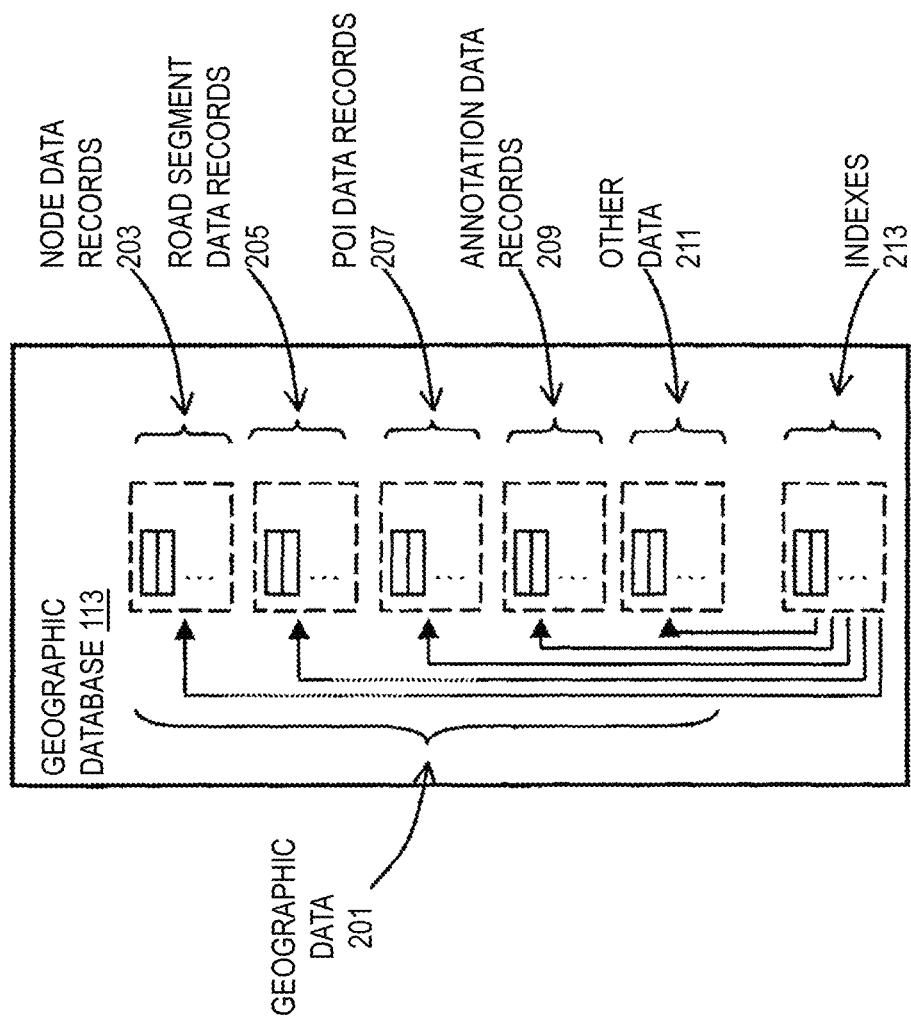
FIG. 2 is a diagram of a geographic database of the system, according to various embodiments.

FIG. 2 is a diagram of the geographic database of system 100, according to various embodiments. In the embodiments, textured 3D data and associated models can be stored, associated with, and/or linked to the geographic database 113 or data thereof. In one embodiment, the geographic or map database 113 includes geographic data 201 used for (or configured to be compiled to be used for) mapping and/or navigation-related services, such as for route information, service information, estimated time of arrival information, location sharing information, speed sharing information, and/or geospatial information sharing, according to exemplary embodiments. For example, the geographic database 113 includes node data records 203, road segment or link data records 205, POI data records 207, annotation data records 209, other data records 211, for example, wherein an index 213 may provide additional information about the records/data. More, fewer or different data records can be provided. In one embodiment, the other data records 211 include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example.

In exemplary embodiments, the road segment data records 205 are links or segments representing roads, streets, or paths, as can be used in the calculated route or recorded route information for identifying objects present in an image of a geo-location, generating accurate 3D models for the objects, and aligning the 3D models to their corresponding objects in an application, according to exemplary embodiments. The node data records 203 are end points corresponding to the respective links or segments of the road segment data records 205. The road link data records 205 and the node data records 203 represent a road network, such as used by vehicles, cars, and/or other entities. Alternatively, the geographic database 113 can contain path segment and node data records or other data that represent pedestrian paths or areas in addition to or instead of the vehicle road record data, for example.

The road link and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 113 can include data about the POIs and their respective locations in the POI data records 207. The geographic database 113 can also include data about places, such as cities, towns, or other communities, and other geographic features, such as bodies of water, mountain ranges, etc. Such place or feature data can be part of the POI data 207 or can be associated with POIs or POI data records 207 (such as a data point used for displaying or representing a position of a city).

The geographic database 113 can be maintained by the content providers 119 in association with the service providers 115 (e.g., a map developer). A map developer can collect geographic data to generate and enhance the geographic database 113. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 113 can be a master geographic database stored in a format that facilitates updating, maintenance, and development. For example, the master geographic database 113 or data in the master geographic database 113 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data or geospatial information is compiled (such as into a platform specification format (PSF) format) to organize and/or configure the data for performing map or navigation-related functions and/or services, such as map annotation, route calculation, route guidance, map display, speed calculation, distance and travel time functions, and other functions, by a navigation device, such as by a UE 101, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device (e.g., a vehicle system) developer can perform compilation on a received geographic database in a delivery format to produce one or more compiled navigation databases.

As mentioned above, the geographic database 113 can be a master geographic database, but in alternate embodiments, the geographic database 113 can represent a compiled navigation database that can be used in or with end user devices (e.g., UEs 101, a vehicle system, etc.) to provide navigation-related functions. For example, the geographic database 113 can be used with the end user device 101 to provide an end user with navigation features. In such a case, the geographic database 113 can be downloaded or stored on the end user device or a UE 101, such as in applications 103, or the end user device or the UE 101 can access the geographic database 113 through a wireless or wired connection (such as via a server and/or the communication network 107), for example.

Figure 3:
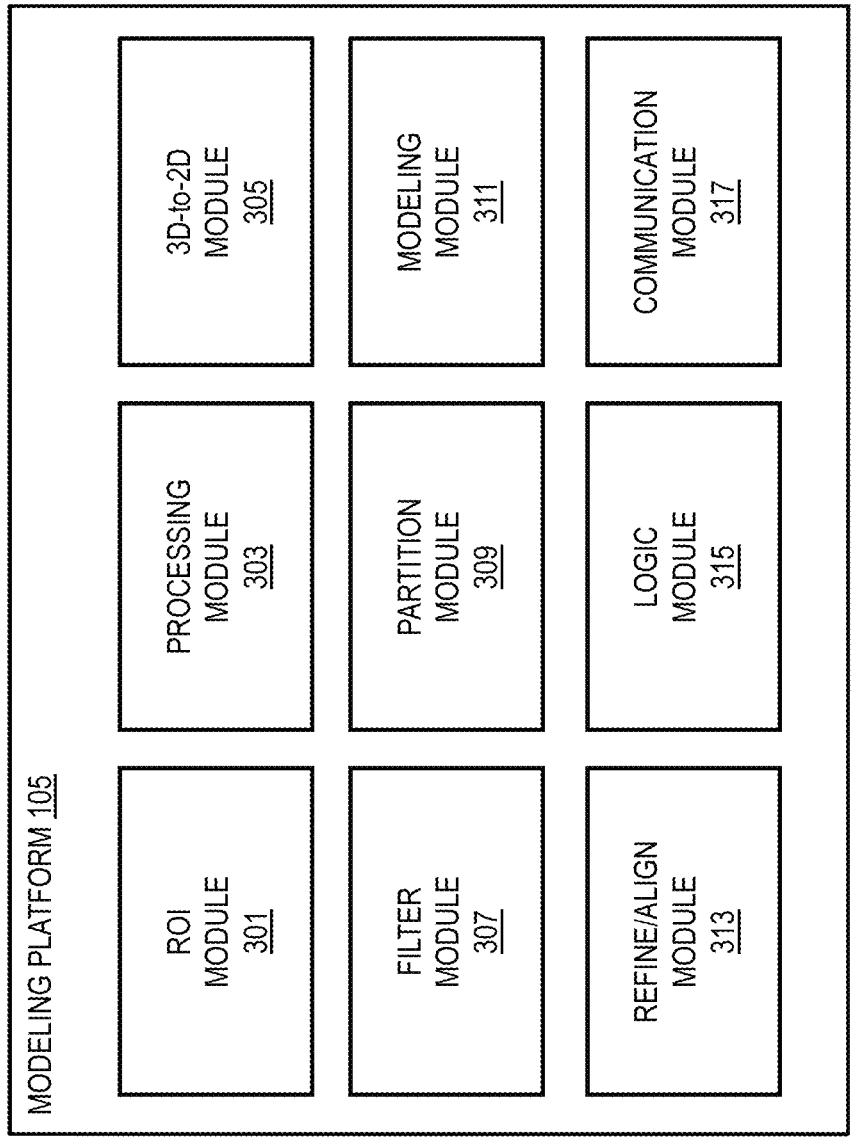
FIG. 3 is a diagram of the components of the modeling platform, according to one embodiment.

FIG. 3 is a diagram of the components of the modeling platform 105, according to one embodiment. By way of example, the modeling platform 105 may include one or more components for identifying objects present in an image of a geo-location, generating accurate 3D models for the objects, and aligning the 3D models to their corresponding objects in an application such as a map application. In one embodiment, the modeling platform 105 may include a ROI module 301, a processing module 303, a 3D-to-2D module 305, a filter module 207, a partition module 309, a modeling module 311, a refine/align module 313, a logic module 315, and a communication module 317. It is contemplated that the functions of these components may be combined in one or more components or performed by other components with similar functionalities.

In one embodiment, the ROI module 301 may determine one or more ROIs within a set of textured 3D mesh data, the textured 3D mesh data representing at least one geographic area. In one instance, the ROIs and/or the geographic area may be determined by a service provider, a user of a service, an application at a user device, etc. In one embodiment, the textured 3D representation may be a polygon-based 3D representation, providing height information, on which the 3D texture information is mapped.

In one embodiment, the processing module 303 may include one or more algorithms for processing the textured 3D representation and/or other data for providing support to other modules of the modeling platform 105 and/or to the system 100. For example, the processing module 303 may interface and cooperate with other modules of the modeling platform 105 for pre or post processing of data sets and providing various subsets or mathematical models based on the processing of the data sets.

In one embodiment, the 3D-to-2D module 305 may cause a generation of a 2D depth image representation of the one or more ROIs by causing a projection of 3D texture information of the textured 3D representation onto a two-dimensional footprint. In one scenario, once a ROI is determined, the 3D mesh input data may be processed to extract 3D triangles included inside of the ROI. Then, a piece-wise 3D to 2D projection may be utilized to obtain a corresponding 2D depth image. Intensity value for each pixel of the 2D depth image may be computed based on a linear interpolation of corresponding 3D triangle in the mesh data.

In one embodiment, the filter module 307 may cause a filtering of the textured 3D mesh data in the one or more ROIs to remove mesh data below at least one threshold height based, at least in part, on the at least one 2D depth image representation. In one example, mesh data below a certain level of a building may be filtered out and the remaining mesh data associated with levels above the threshold may be retained for further processing. In some scenarios, even without other objects (e.g., trees, cars, people, etc.) near a building, aerial photogrammetry surface mesh errors tend to be toward the bottom of buildings; hence, filtering out these errors may allow creating models of the wall surfaces using the filtered data for upper levels of the building. In one embodiment, the threshold height may be determined by one or more algorithms utilized by the system 100, for example, from previous data associated with the ROI and/or other nearby buildings.

In one embodiment, the partition module 309 may utilize one or more algorithms to partition the filtered textured 3D mesh data into one or more clusters using, at least one parametric, non-parametric, or a combination thereof clustering technique, wherein the generation of the at least one three-dimensional model is based, at least in part, on the one or more clusters. In some scenarios, the remaining textured 3D mesh data may be processed and partitioned into a number of clusters utilizing a non-parametric (e.g., meanshift-based) clustering technique. In one embodiment, a contour based partitioning method may be utilized and followed by a meanshift-based clustering procedure. In one embodiment, the one or more clusters may be based, at least in part, on a similarity with respect to one or more properties, and wherein the one or more properties include, at least in part, a geometry property, a geometrical orientation property, a geo-location property, a texture property, an edge orientation property, or a combination thereof.

In one embodiment, the modeling module 311 may process or facilitate a processing of the filtered textured 3D mesh data for a generation of a partial 3D model of one or more objects located within the one or more ROIs. In one example, the modeling module 311 may generate a complete 3D model of a building by utilizing one or more algorithms to extrapolate the upper surfaces (e.g., above the first floor) of the building down to the ground surface (e.g., generate the lower surfaces that were filtered out) surrounding the building.

In one embodiment, the refine/align module 313 may process or facilitate a processing of a 3D model using a pair-wise surface-to-surface computation to refine the at least one 3D model. In one embodiment, a pair-wise surface-to-surface (e.g., plane-to-plane) intersection computation may be used to refine/touchup (e.g. close the gaps, remove small extruding facades, etc.) a 3D model of an object.

In one embodiment, the logic module 315 may manage tasks, including tasks performed by the other modules. For example, although the other modules may perform their actual tasks, the logic module 315 may determine when and how those tasks are performed or otherwise direct the other modules to perform the task. In one embodiment, the logic module 315 may determine to process any of above data sets in substantially real-time, batch mode, according to a schedule, or a combination thereof. By way of example, the schedule may be based, at least in part, on computational resources, amount of available data, etc.

The communication module 317 may be used for communication between various elements of the system 100 as well as between modules, elements, components, etc. of the modeling platform 105. For example, the communication module 317 may be used to communicate commands, requests, data, etc., to/from the applications 103, the content providers 119, or the like.

Figure 4:
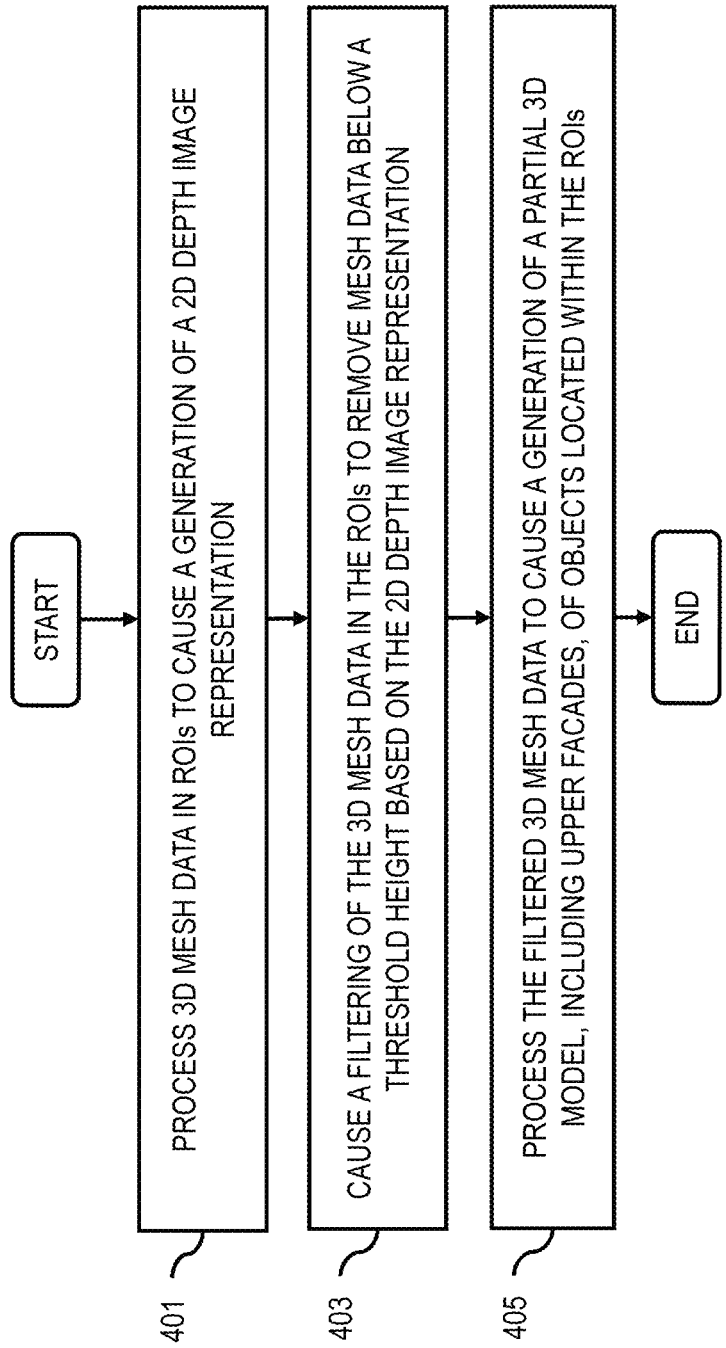
FIGS. 4 through 6 are flowcharts of various processes for, at least, classifying objects that are present at a geo-location and providing an uncluttered presentation of images of some of the objects in an application such as a map application, according to various embodiments.
Figure 5:
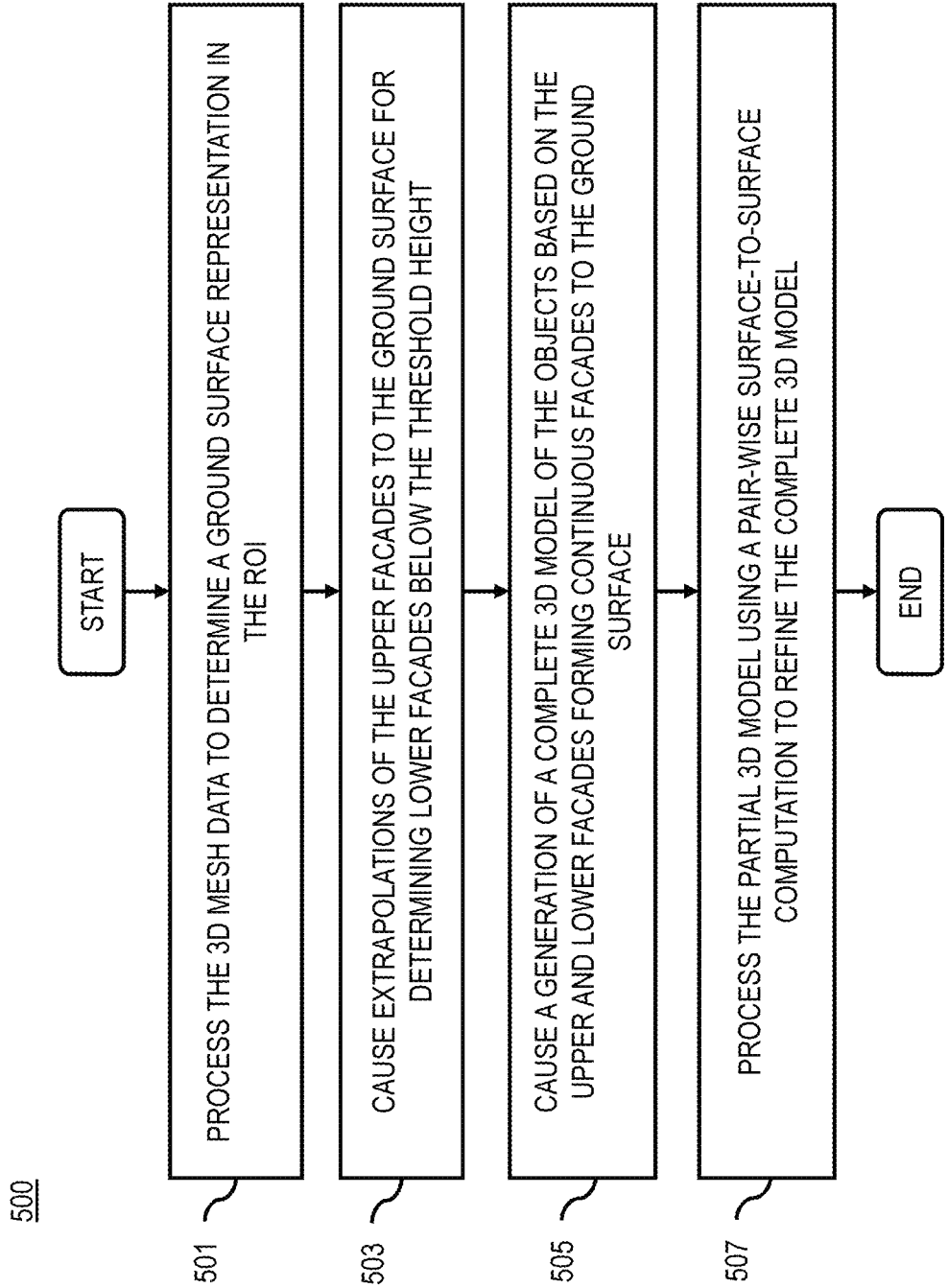
Figure 6:
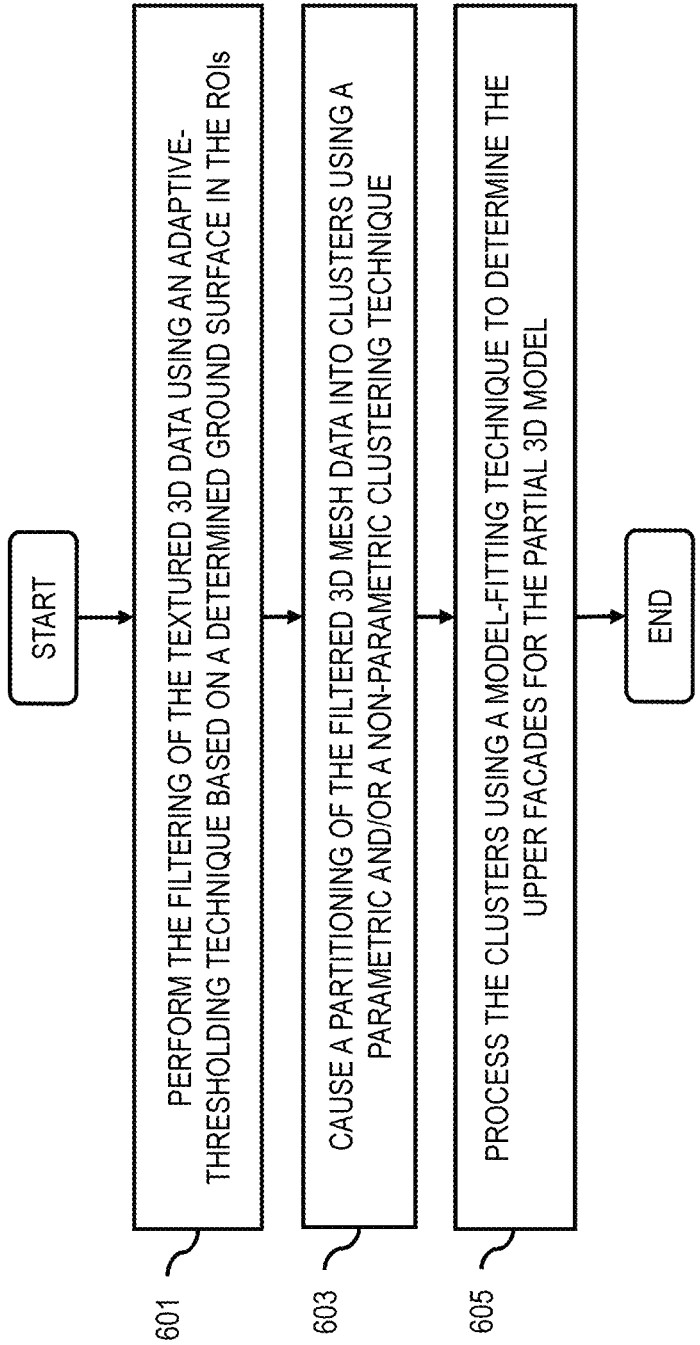
Figure 9:
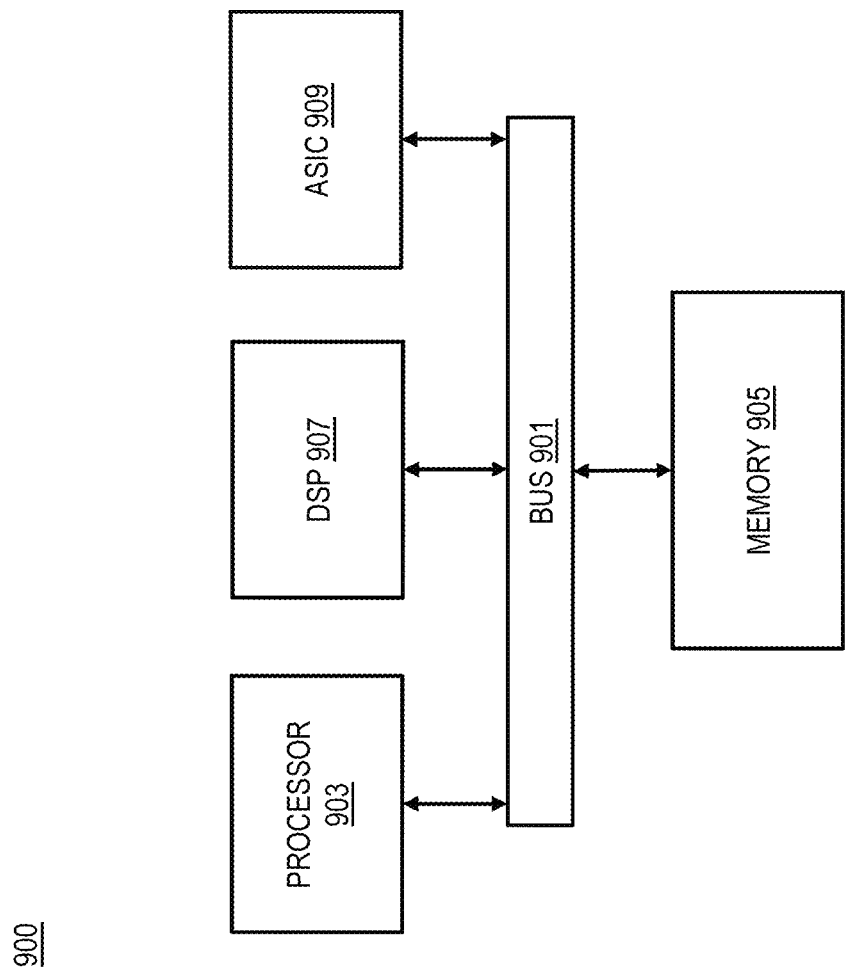
FIG. 9 is a diagram of a chip set that can be used to implement an embodiment of the invention.

FIGS. 4 through 6 are flowcharts of various processes for, at least, identifying objects present in an image of a geo-location, generating accurate 3D models for the objects, and aligning the 3D models to their corresponding objects in an application, according to various embodiments. In various embodiments, the modeling platform 105 may perform one or more portions of the processes 400, 500, and 600 which may be implemented in, for instance, a chip set including a processor and a memory as shown in FIG. 9. As such, the modeling platform 105 can provide means for accomplishing various parts of the process 400, 500, and 600 as well as means for accomplishing other processes in conjunction with other components of the system 100. Throughout these processes, the modeling platform 105 may be referred to as completing various portions of the processes 400, 500, and 600; however, it is understood that other components of the system 100 can perform some of and/or all of the process steps. Further, for clarity in discussing the 400, 500, and 600 processes, the modeling platform 105 is referred to as completing various steps of said processes; however, said processes and/or example steps described therein may be performed in any suitable order and/or may be optional.

The process 400 may begin at step 401 of the FIG. 4, where the modeling platform 105 may process and/or facilitate a processing of textured 3D mesh data in one or more regions of interest to cause, at least in part, a generation of at least one 2D depth image representation. In one embodiment, the textured three-dimensional mesh data, the one or more regions of interest, or a combination thereof is received from another source (e.g., a service provider, another element of a system, etc.) and is associated with at least one geographic area. In one scenario, once a ROI is determined, the 3D mesh input data may be processed to extract 3D triangles included in the ROI. Then, a piece-wise 3D to 2D projection may be utilized to obtain a corresponding 2D depth image. Intensity value for each pixel of the 2D depth image may be computed based on a linear interpolation of corresponding 3D triangle in the mesh data.

In 403, the modeling platform 105 may cause, at least in part, a filtering of the textured 3D mesh data in the one or more ROIs to remove mesh data below at least one threshold height based, at least in part, on the at least one 2D depth image representation. In one example, mesh data below a certain level of a building may be filtered out and the remaining mesh data associated with levels above the threshold may be retained for further processing. In some scenarios, even without other objects (e.g., trees, cars, people, etc.) near a building, aerial photogrammetry surface mesh errors tend to be toward the bottom of buildings; hence, filtering out these errors may allow creating models of the wall surfaces using the filtered data for upper levels of the building. In one embodiment, the threshold height may be determined by one or more algorithms utilized by the system 100, for example, from previous data associated with the ROI and/or another nearby building.

In 405, the modeling platform 105 may process and/or facilitate a processing of the filtered textured 3D mesh data to cause, at least in part, a generation of at least one partial 3D model, including one or more upper facades above the at least one threshold height, of one or more objects located within the one or more regions of interest. In one example, the system 100 may process the remaining 3D mesh data to determine base, elevation, wall surfaces, or the like information associated with a building by utilizing color and texture information embedded in the textured 3D mesh data. In one scenario, a partial 3D model of a building may include surfaces/facades from the top of the building to a threshold height above the ground surface surrounding the building.

The process 500 may begin at step 501 of the FIG. 5, where the modeling platform 105 may process and/or facilitate a processing of the textured 3D mesh data to determine at least one ground surface representation in the one or more regions of interest, wherein removing the mesh data below the at least one threshold height includes removing the textured 3D mesh data associated with the at least one ground surface representation. In one scenario, the filtering process may remove ground level as well as lower level (e.g., surrounding a building) mesh data within the ROI. In one embodiment, the filtering process may yield 3D mesh data for a building without any irregular surrounding mesh data (e.g., for cars, trees, other objects, irregular shapes of the building walls/features, etc.) for lower levels of the building.

In 503, the modeling platform 105 may cause, at least in part, one or more extrapolations of the one or more upper facades to the at least one ground surface for determining one or more lower facades below the at least one threshold height. For example, one or more algorithms may be used to extrapolate the upper surfaces (e.g., above the first floor) of a building down to the ground surface surrounding the building.

In 505, the modeling platform 105 may cause, at least in part, a generation of at least one complete three-dimensional model of the one or more objects based, at least in part, on the one or more upper and the one or more lower facades forming one or more continuous facades to the at least one ground surface. For example, once the lower surfaces are determined by extrapolating the upper surfaces down to the ground level, a complete 3D model of the building may be generated.

In 507, the modeling platform 105 may process and/or facilitate a processing of the at least one partial 3D model using at least one pair-wise surface-to-surface computation to refine the at least one complete 3D model. In one embodiment, a pair-wise surface-to-surface (e.g., plane-to-plane) intersection computation may be used to refine/touchup (e.g. close the gaps, remove small extruding facades, etc.) a 3D model of an object.

The process 600 may begin at step 601 of the FIG. 6, where the modeling platform 105 may perform the filtering of the textured 3D mesh data using at least one adaptive-thresholding technique based, at least in part, on a determined ground surface in the one or more regions of interest. In one embodiment, an adaptive-thresholding technique, for example, Otsu's thresholding method may be applied to the 2D depth image to filter out ground and lower surrounding meshes associated with a building in the ROI. The use of an adaptive filtering algorithm may allow the algorithm to follow a sloping ground (e.g., a hilly area), rather than using a single elevation threshold for the entire ROI.

In 603, the modeling platform 105 may cause, at least in part, a partitioning of the filtered textured 3D mesh data into one or more clusters using, at least one parametric, non-parametric, or a combination thereof clustering technique, wherein the generation of the at least one partial three-dimensional model is based, at least in part, on the one or more clusters. In some scenarios, the remaining textured 3D mesh data may be processed and partitioned into a number of clusters utilizing a parametric, non-parametric, or a combination thereof clustering technique. In one embodiment, a contour based partitioning method may be utilized and followed by a parametric, non-parametric, or a combination thereof clustering procedure. In one embodiment, the one or more clusters are based, at least in part, on a similarity with respect to one or more properties, and wherein the one or more properties include, at least in part, a geometry property, a geometrical orientation property, a geo-location property, a texture property, an edge orientation property, or a combination thereof.

In 605, the modeling platform 105 may process and/or facilitate a processing of the one or more clusters using at least one model-fitting technique to determine the one or more upper facades for the at least one partial 3D model. In one embodiment, a RANSAC based model fitting procedure (e.g., for plane/surface fitting) may be applied on each cluster of 3D mesh data independently to extract corresponding building facades. In some scenarios, a RANSAC method for estimating surfaces may be less sensitive, when compared to other methods like least squares optimization, to data that may be an outlier of a data set.

FIGS. 7A through 7G include illustrations associated with a building in a region of interest and a 3D model of the building, according to various embodiments.

Figure 7A:
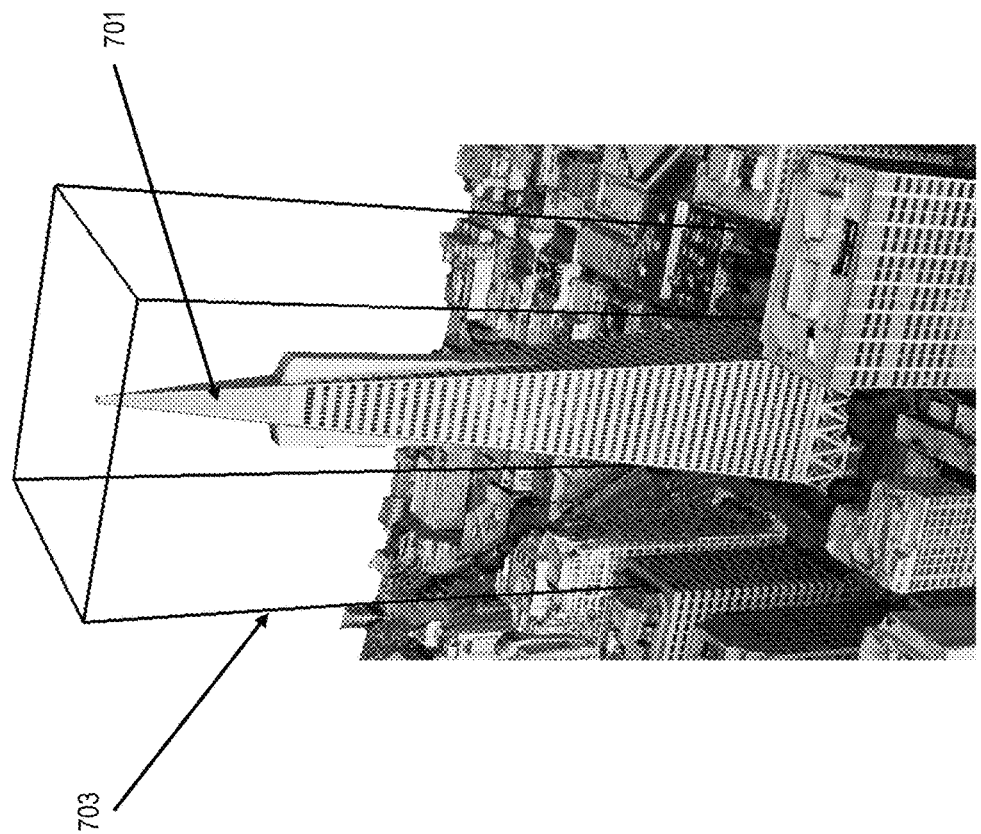
Figure 7B:
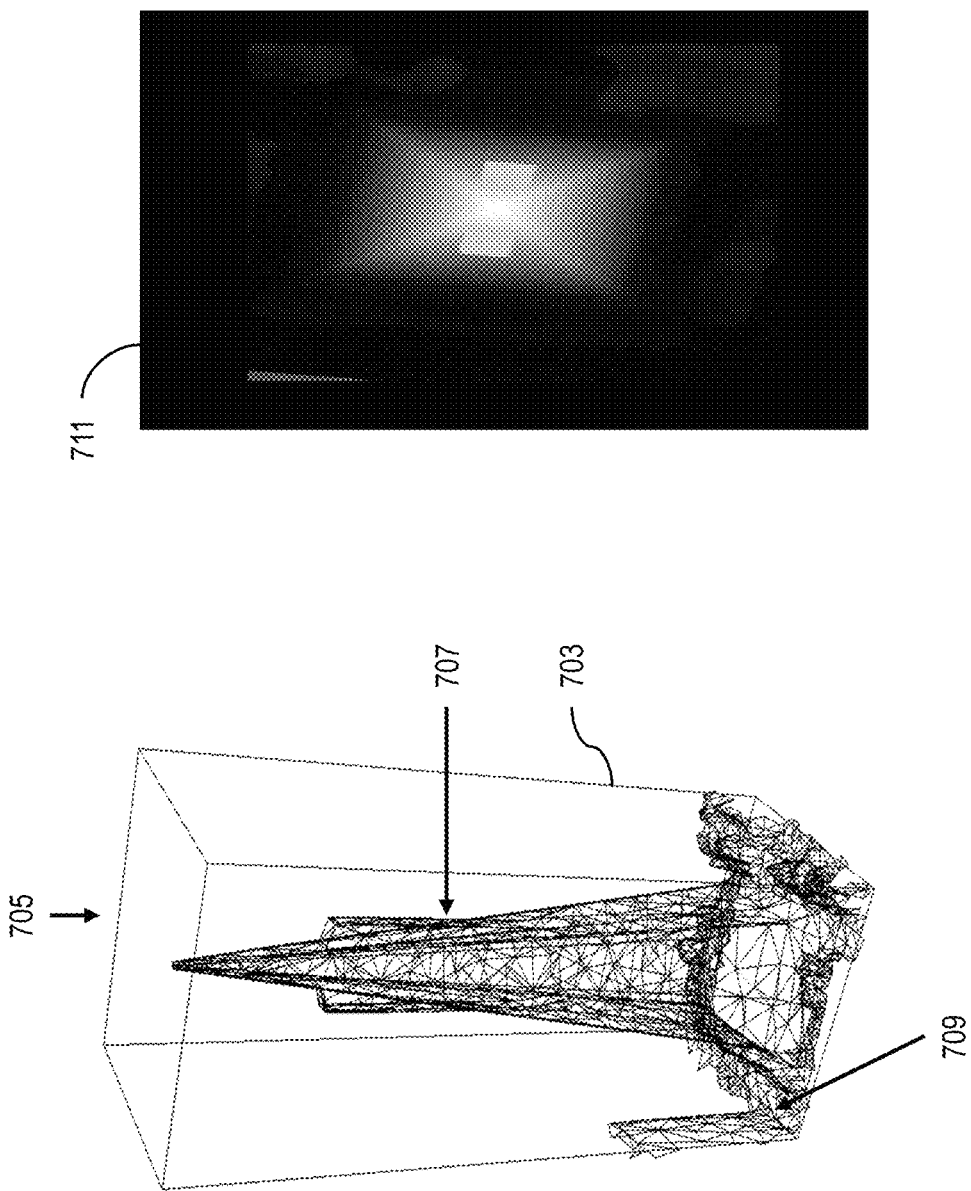

FIG. 7A includes an image of a building 701 and other objects in a ROI 703 (rectangular box area). FIG. 7B includes an illustration 705, which includes an extracted 3D triangular mesh representation 707 of the building 701 in the ROI 703. Also shown in the illustration is a 3D triangular mesh representation 709 of the other objects including, for example, cars, people, or other smaller buildings/structures in the ROI 703. FIG. 7B also includes an illustration 711 of a 2D depth image (e.g., a top view) of the 3D triangular mesh representation 707, wherein intensity of each pixel is computed based on a linear interpolation of a corresponding 3D triangle in the 3D triangular mesh representation 707.

Figure 7C:
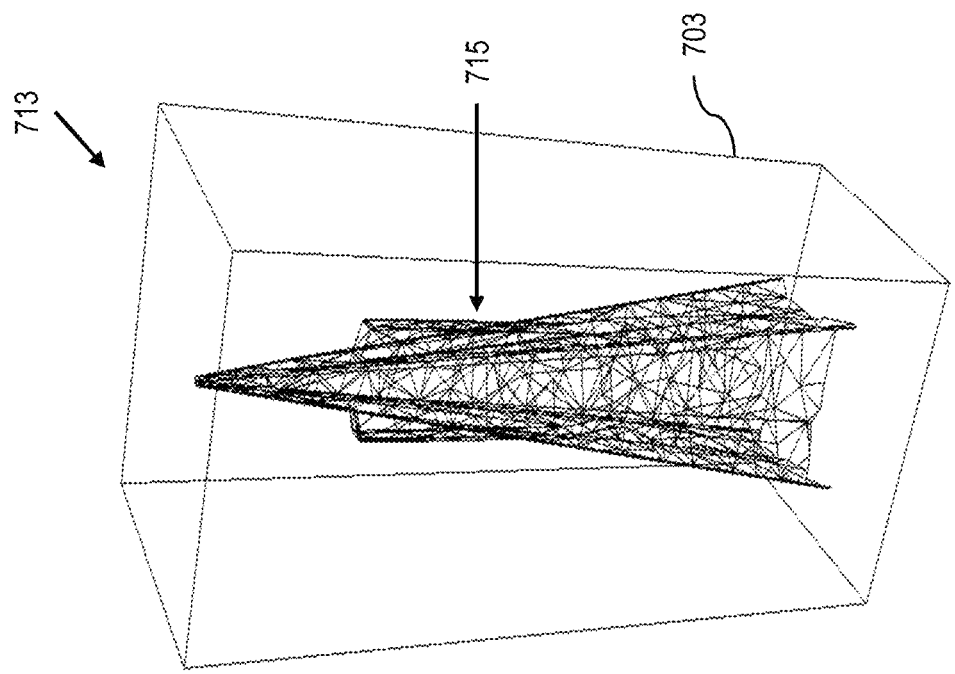

FIG. 7C includes an illustration 713 showing a 3D triangular mesh representation 715, which is based on a mesh filtering of the 3D triangular mesh 707 and the 3D triangular mesh representation 709 in FIG. 7B. The mesh filtering removes lower sections of the 3D triangular mesh representation 707 (e.g., the building 701) as well as removing the surrounding 3D triangular mesh representation 709 of the other objects in the ROI 703.

Figure 7D:
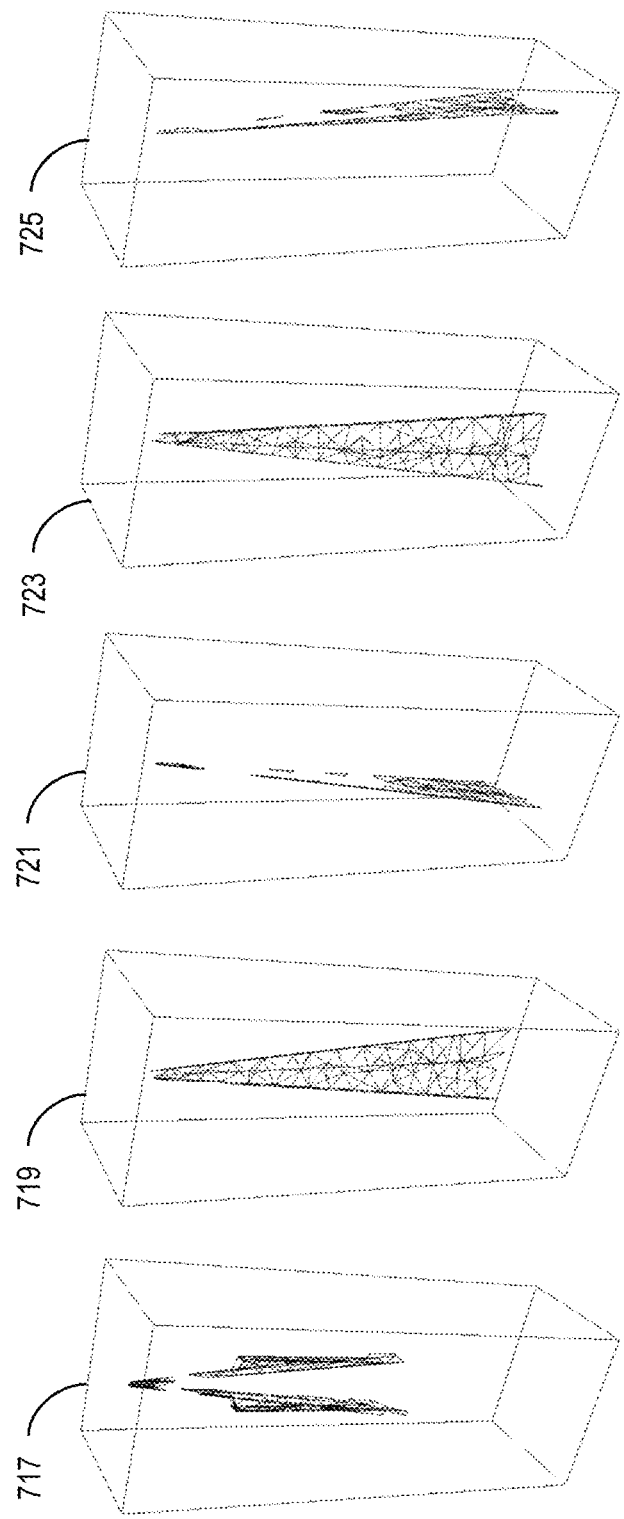

FIG. 7D includes illustrations 717, 719, 721, 723, and 725 of side views of the 3D triangular mesh representation 715 of a building, which may be generated by partitioning the remaining triangular mesh 715 into a number of clusters, with similar properties including plane normal, geolocation, texture, etc., by utilizing a parametric, non-parametric, or a combination thereof clustering technique or a contour based partitioning followed by a parametric, non-parametric, or a combination thereof clustering procedure.

Figure 7E:
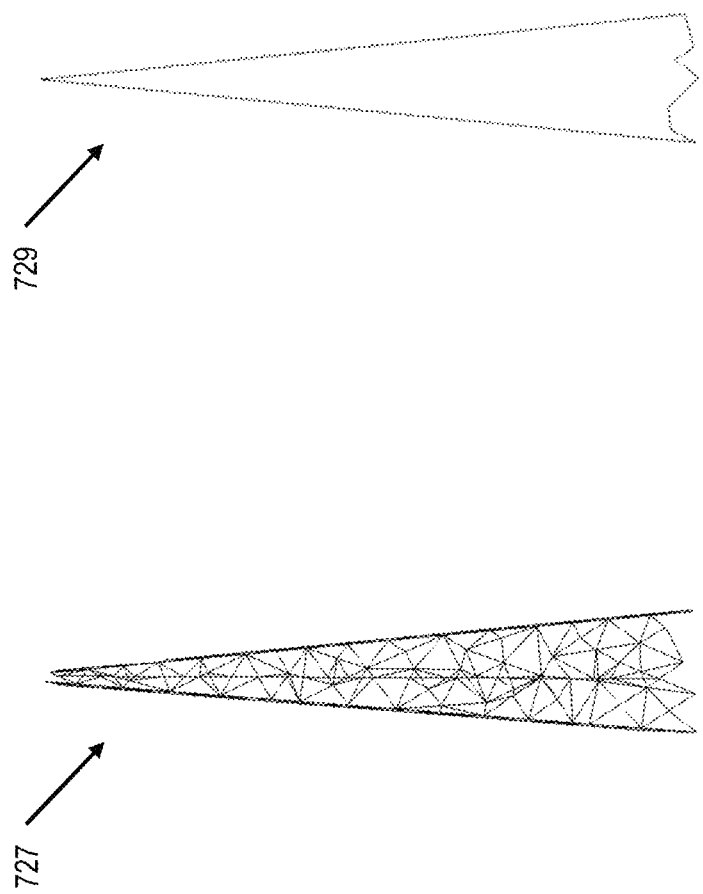

In FIG. 7E, after fitting a surface to the clusters in diagram 727 (e.g., in FIG. 7D), the extent of the clusters is extracted as a contour shown in diagram 729.

FIG. 7F includes a partial 3D model 731 for the 3D triangular mesh representation 715 (e.g., upper surfaces/facades of the building 701), wherein the lower portions 709 have been filtered out. Illustration 733 shows a complete 3D model for the building 701 after extrapolations of the upper surfaces/facades down to the ground surface surrounding the building 701. In one embodiment, a pair-wise surface-to-surface (e.g., plane-to-plane) intersection computation may be used to do a final touchup (e.g., close the gaps, remove small extruding facades, etc.) of the complete 3D model 733.

Figure 7G:
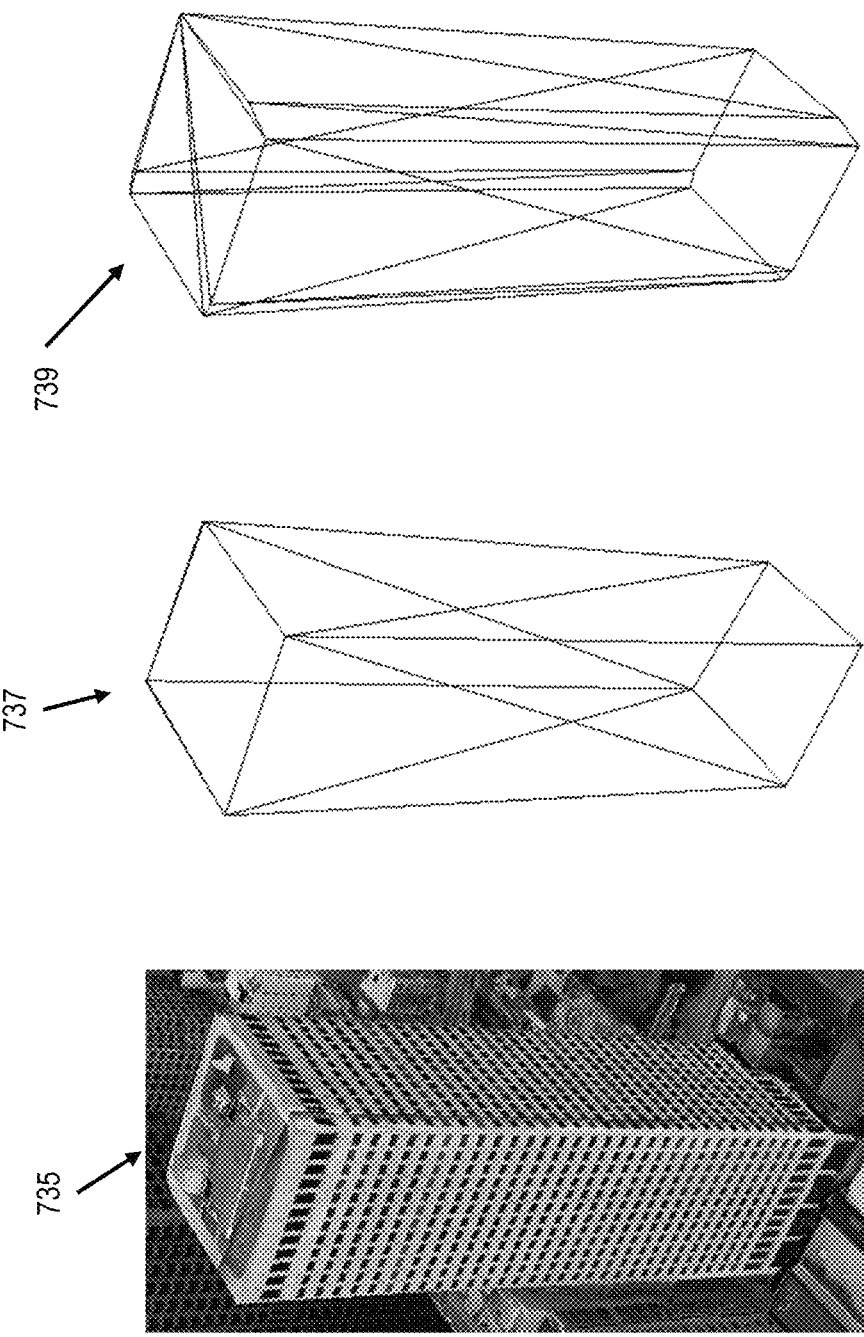

FIG. 7G illustrates an image 735 showing a shoe-box shaped building and a concise 3D model 737 generated by one or more methods discussed herein. Also shown is a more complicated 3D model 739 generated by a current extruded-footprint method. The extra complexity of the extrusion-based model is driven by noise in the mesh and adds no value to the model. Although designed to model buildings or objects with more complex or irregular shapes, the new proposed method may also be applied to buildings or objects with simple shapes. In some cases, the proposed method may produce models that may be more accurate while requiring less memory (e.g., for storage, processing, transmission, etc.) than extrusion-based models.

Methods discussed herein provide support for use of a generic approach to model more general types of buildings including both polygon extrusions representation (e.g., a shoe-box type model), non-polygon extrusions models (e.g., a pyramid type building), a curved surfaces such as a hemisphere, or other types of buildings. Also, resulting parametric models may be more compact, reducing the resources required to store, transmit and render. Additionally, choice of input data may avoid complicated, unsolved issues with aligning multiple data sources to avoid internal inconsistencies and inconsistencies with the world. Further, supports built-in mitigation for the types of data errors common in the selected input data. Use of ROIs may be more suitable for distributed computing than methods which process a whole scene.

The processes described herein for identifying objects present in an image of a geo-location, generating accurate 3D models for the objects, and aligning the 3D models to their corresponding objects in an application may be advantageously implemented via software, hardware, firmware, or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
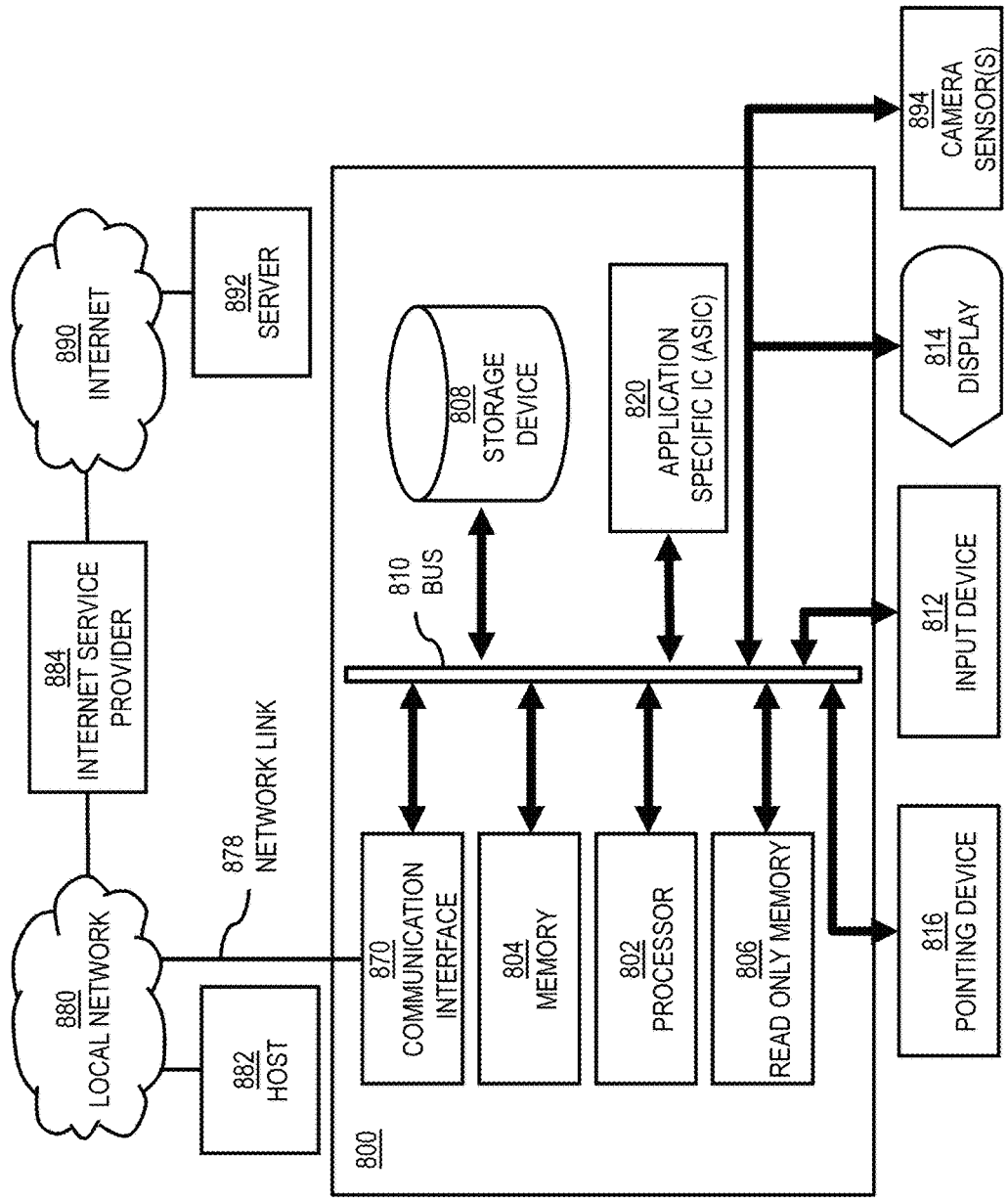
FIG. 8 is a diagram of hardware that can be used to implement an embodiment of the invention.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to identify objects present in an image of a geo-location, generate accurate 3D models for the objects, and align the 3D models to their corresponding objects in an application as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of identifying objects present in an image of a geo-location, generating accurate 3D models for the objects, and aligning the 3D models to their corresponding objects in an application.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to identifying objects present in an image of a geo-location, generating accurate 3D models for the objects, and aligning the 3D models to their corresponding objects in an application. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or any other dynamic storage device, stores information including processor instructions for identifying objects present in an image of a geo-location, generating accurate 3D models for the objects, and aligning the 3D models to their corresponding objects in an application. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash memory storage, for storing information, including instructions, that persists even when the computer system 800 is turned off or otherwise loses power.

Information, including instructions for identifying objects present in an image of a geo-location, generating accurate 3D models for the objects, and aligning the 3D models to their corresponding objects in an application, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814, and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners, and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic, or electromagnetic signals, including infrared and optical signals that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 107 for identifying objects present in an image of a geo-location, generating accurate 3D models for the objects, and aligning the 3D models to their corresponding objects in an application.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization, or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880, and communications interface 870. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set or chip 900 upon which an embodiment of the invention may be implemented. Chip set 900 is programmed for identifying objects present in an image of a geo-location, generating accurate 3D models for the objects, and aligning the 3D models to their corresponding objects in an application as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions. Chip set or chip 900, or a portion thereof, constitutes a means for performing one or more steps of identifying objects present in an image of a geo-location, generating accurate 3D models for the objects, and aligning the 3D models to their corresponding objects in an application.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to identify objects present in an image of a geo-location, generate accurate 3D models for the objects, and align the 3D models to their corresponding objects in an application. The memory 905 also stores the data associated with or generated by the execution of the inventive steps.

Figure 10:
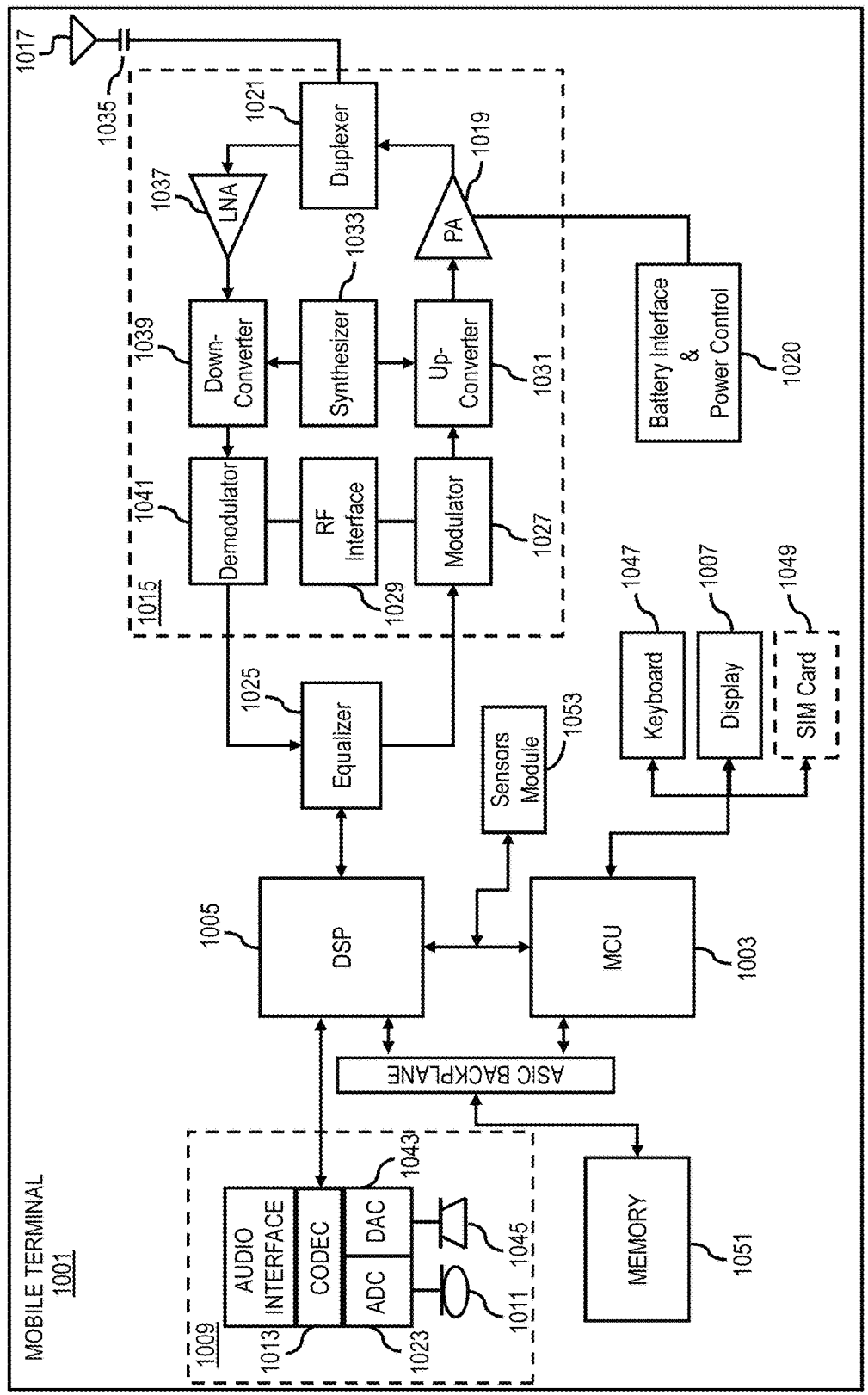
FIG. 10 is a diagram of a mobile terminal (e.g., handset) that can be used to implement an embodiment of the invention.

FIG. 10 is a diagram of exemplary components of a mobile terminal (e.g., handset) for communications, which is capable of operating in the system of FIG. 1, according to one embodiment. In some embodiments, mobile terminal 1001, or a portion thereof, constitutes a means for performing one or more steps of identifying objects present in an image of a geo-location, generating accurate 3D models for the objects, and aligning the 3D models to their corresponding objects in an application. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a base-band integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of identifying objects present in an image of a geo-location, generating accurate 3D models for the objects, and aligning the 3D models to their corresponding objects in an application. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The Pa. 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 for identifying objects present in an image of a geo-location, generating accurate 3D models for the objects, and aligning the 3D models to their corresponding objects in an application. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

Additionally, sensors module 1053 may include various sensors, for instance, a location sensor, a speed sensor, an audio sensor, an image sensor, a brightness sensor, a biometrics sensor, various physiological sensors, a directional sensor, and the like, for capturing various data associated with the mobile terminal 1001 (e.g., a mobile phone), a user of the mobile terminal 1001, an environment of the mobile terminal 1001 and/or the user, or a combination thereof, wherein the data may be collected, processed, stored, and/or shared with one or more components and/or modules of the mobile terminal 1001 and/or with one or more entities external to the mobile terminal 1001.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order. The methods and systems (including steps and components thereof) can be mixed, matched, and/or rearranged. Additionally more, fewer, or different method steps or device/system components may be used.

What is claimed is:

1. A method comprising:
processing textured three-dimensional mesh data in one or more regions of interest to generate at least one two-dimensional depth image representation and to determine at least one ground surface representation in the one or more regions of interest, wherein the textured three-dimensional mesh data is based, at least in part, on at least one aerial photogrammetry surface mesh;
filtering the textured three-dimensional mesh data in the one or more regions of interest to remove mesh data of one or more lower facades of at least one building below at least one threshold height based, at least in part, on the at least one two-dimensional depth image representation; and
processing the filtered textured three-dimensional mesh data, including the at least one aerial photogrammetry surface mesh, to generate at least one partial three-dimensional model of one or more objects located within the one or more regions of interest, wherein the at least one partial three-dimensional model includes one or more upper facades of the at least one building above the at least one threshold height,
wherein removing the mesh data below the at least one threshold height includes removing the textured three-dimensional mesh data associated with the at least one ground surface representation using at least one adaptive-thresholding technique configured to follow a sloping ground with more than one elevation in the one or more regions of interest.

2. A method of claim 1, further comprising:
extrapolating the one or more upper facades to the at least one ground surface for determining one or more lower facades below the at least one threshold height.

3. A method of claim 2, further comprising:
generating at least one complete three-dimensional model of the one or more objects based, at least in part, on the one or more upper and the one or more lower facades forming one or more continuous facades to the at least one ground surface.

4. A method of claim 3, further comprising:
processing the at least one partial three-dimensional model using at least one pair-wise surface-to-surface computation to refine the at least one complete three-dimensional model.

5. A method of claim 1, further comprising:
partitioning the filtered textured three-dimensional mesh data into one or more clusters using, at least one parametric, non-parametric, or a combination thereof clustering technique,
wherein the generation of the at least one partial three-dimensional model is based, at least in part, on the one or more clusters.

6. A method of claim 5, further comprising:
processing the one or more clusters using at least one model-fitting technique to determine the one or more upper facades for the at least one partial three-dimensional model.

7. A method of claim 5, wherein the one or more clusters are based, at least in part, on a similarity with respect to one or more properties, and wherein the one or more properties include, at least in part, a geometry property, a geometrical orientation property, a geo-location property, a texture property, an edge orientation property, or a combination thereof.

8. A method of claim 1, wherein the textured three-dimensional mesh data, the one or more regions of interest, or a combination thereof is received from another source and is associated with at least one geographic area.

9. An apparatus comprising:
at least one processor; and
at least one memory including computer program code for one or more programs,
the at least one memory and the computer program code configured to, with the at least one processor, cause the apparatus to perform at least the following:
process textured three-dimensional mesh data in one or more regions of interest to generate at least one two-dimensional depth image representation and to determine at least one ground surface representation in the one or more regions of interest, wherein the textured three-dimensional mesh data is based, at least in part, on at least one aerial photogrammetry surface mesh;
filter the textured three-dimensional mesh data in the one or more regions of interest to remove mesh data of one or more lower facades of at least one building below at least one threshold height based, at least in part, on the at least one two-dimensional depth image representation; and
process the filtered textured three-dimensional mesh data, including the at least one aerial photogrammetry surface mesh, to generate at least one partial three-dimensional model of one or more objects located within the one or more regions of interest, wherein the at least one partial three-dimensional model includes one or more upper facades of the at least one building above the at least one threshold height,
wherein removing the mesh data below the at least one threshold height includes removing the textured three-dimensional mesh data associated with the at least one ground surface representation using at least one adaptive-thresholding technique configured to follow a sloping ground with more than one elevation in the one or more regions of interest.

10. An apparatus of claim 9, wherein the apparatus is further caused to:
extrapolate the one or more upper facades to the at least one ground surface for determining one or more lower facades below the at least one threshold height.

11. An apparatus of claim 10, wherein the apparatus is further caused to:

generate at least one complete three-dimensional model of the one or more objects based, at least in part, on the one or more upper and the one or more lower facades forming one or more continuous facades to the at least one ground surface.

12. An apparatus of claim 11, wherein the apparatus is further caused to:
process the at least one complete three-dimensional model using at least one pair-wise surface-to-surface computation to refine the at least one complete three-dimensional model.

13. An apparatus of claim 9, wherein the apparatus is further caused to:
partition the filtered textured three-dimensional mesh data into one or more clusters using, at least one parametric, non-parametric, or a combination thereof clustering technique,
wherein the generation of the at least one partial three-dimensional model is based, at least in part, on the one or more clusters.

14. An apparatus of claim 13, wherein the apparatus is further caused to:
process the one or more clusters using at least one model-fitting technique to determine the one or more upper facades for the at least one partial three-dimensional model.

15. A computer-readable non-transitory storage medium carrying one or more sequences of one or more instructions which, when executed by one or more processors, cause an apparatus to at least perform the following steps:
processing textured three-dimensional mesh data in one or more regions of interest to generate at least one two-dimensional depth image representation and to determine at least one ground surface representation in the one or more regions of interest, wherein the textured three-dimensional mesh data is based, at least in part, on at least one aerial photogrammetry surface mesh;
filtering the textured three-dimensional mesh data in the one or more regions of interest to remove mesh data of one or more lower facades of at least one building below at least one threshold height based, at least in part, on the at least one two-dimensional depth image representation; and
processing the filtered textured three-dimensional mesh data, including the at least one aerial photogrammetry surface mesh, to generate at least one partial three-dimensional model of one or more objects located within the one or more regions of interest, wherein the at least one partial three-dimensional model includes one or more upper facades of the at least one building above the at least one threshold height,
wherein removing the mesh data below the at least one threshold height includes removing the textured three-dimensional mesh data associated with the at least one ground surface representation using at least one adaptive-thresholding technique configured to follow a sloping ground with more than one elevation in the one or more regions of interest.

16. A computer-readable non-transitory storage medium of claim 15, wherein the apparatus is further caused to:
extrapolating the one or more upper facades to the at least one ground surface for determining one or more lower facades below the at least one threshold height; and
generating at least one complete three-dimensional model of the one or more objects based, at least in part, on the one or more upper and the one or more lower facades forming one or more continuous facades to the at least one ground surface.

* * * * *